United States Patent [19]

Takano et al.

[11] Patent Number: 4,979,143
[45] Date of Patent: Dec. 18, 1990

[54] RECOVERY FROM POWER-DOWN MODE

[75] Inventors: Osamu Takano; Hiroshi Kawakami, both of Tokyo; Masahiko Yakuwa, Wako, all of Japan

[73] Assignees: Oki Electric Industry Co., Ltd.; Honda Giken Kogyo Kabushiki Kaisha, both of Tokyo, Japan

[21] Appl. No.: 215,622

[22] Filed: Jul. 6, 1988

[30] Foreign Application Priority Data

Jul. 9, 1987 [JP] Japan .................. 62-172673

[51] Int. Cl.⁵ ............................. G06F 12/16
[52] U.S. Cl. .................. 364/900; 364/944.2; 364/948.8; 364/925.6; 364/965.78
[58] Field of Search ... 364/200 MS File, 900 MS File, 364/431.11; 371/12

[56] References Cited

U.S. PATENT DOCUMENTS

| | | | |
|---|---|---|---|
| 4,131,942 | 12/1978 | Gillett et al. | 364/200 |
| 4,458,307 | 7/1984 | McAnlis et al. | 364/200 |
| 4,503,479 | 3/1985 | Otsuka et al. | 364/431.11 X |
| 4,528,629 | 7/1985 | Breitling | 371/12 X |
| 4,580,222 | 4/1986 | Fujii | 364/431.11 |
| 4,607,330 | 8/1986 | McMurray et al. | 364/200 |
| 4,788,661 | 11/1988 | Morita | 364/431.11 X |

FOREIGN PATENT DOCUMENTS 147198 9/1982 Japan .

OTHER PUBLICATIONS

Chamoff et al., "Nonvolatile Totals Implementation", IBM Tech. Discl. Bull., vol. 20, No. 10, Mar. 1978, pp. 4071–4072.

Primary Examiner—Thomas M. Heckler
Attorney, Agent, or Firm—Spencer & Frank

[57] ABSTRACT

A single—chip microcomputer recovers efficiently from the power-down state by means of an interrupt that bypasses RAM initialization. It the power supply fails in the power-down mode, restoration of the power supply later causes the microcomputer to reset and initialize its RAM contents.

30 Claims, 3 Drawing Sheets

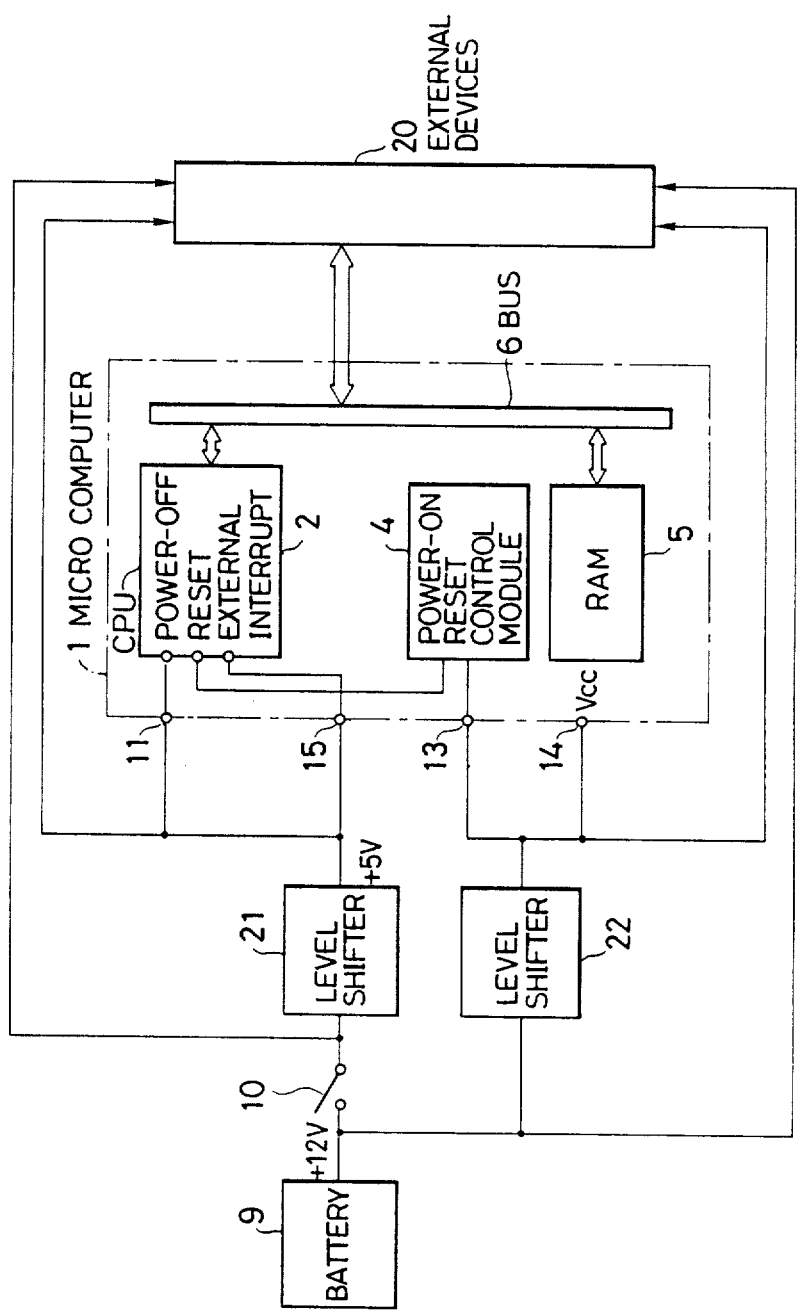
F I G. 3

RECOVERY FROM POWER-DOWN MODE

BACKGROUND OF THE INVENTION

This invention relates to a control system, e.g., an automobile engine control system, including a single-chip microcomputer, and more specifically to a method of recovery from a power-off state.

Microcomputer systems such as those used in automobile engine control system have a volatile memory, such as a random access memory (RAM), the contents of which should preferably be retained even while the control system is not operating. This is because part of the data in the RAM is updated or adjusted through learning control or the like, to suit the particular automobile, the particular environment in which the automobile is in use and the particular driver. When the RAM and the central processing unit (CPU) are on separate chips, it is possible to provide a back-up power supply to the RAM chip that holds the RAM contents intact while the system's main power, e.g., the one that is turned on and off by an ignition key switch, is off. A problem arises, however, in a single-chip microcomputer system in which the CPU and RAM are both on the same chip. If power is kept supplied to the chip, the CPU continues to run while the main power is off, causing current to be consumed unnecessarily. If the power is not supplied to the chip, however, the RAM contents are lost.

In answer to this problem, many recent single-chip microcomputers have a power-down mode. In the power-down mode, the CPU halts to reduce the power consumption but the on-chip RAM contents are kept unchanged. Thus when the microcomputer recovers from the power-down mode, program execution can restart with the same data in memory.

It is of course possible that the power supply might be interrupted while the microcomputer chip is in the power-down mode. In that case it is necessary for the RAM contents to be initialized on recovery from the power-down mode, so that program execution will not start with unpredictable data. It is therefore necessary to examine; on recovery from a power-down mode, whether the power supply has been interrupted. A prior art scheme for this examination is to have the CPU write a fixed value in a certain location in the on-chip RAM just before it enters the power-down mode. On recovery from the power-down mode, the first action of the CPU is to check this location in the RAM. If the value is unchanged, the RAM contents are considered to be intact and the CPU proceeds to execute its main program using the existing RAM data. If the value is incorrect, the power supply is considered to have been interrupted or to have failed and the CPU initializes the RAM contents before executing its main program.

The method of recovering from the power-down mode outlined above is unsatisfactory, however, for several reasons. One problem is that entry into the power-down mode is delayed by the amount of time required to write the fixed value in the RAM. Another problem is that space must be set aside for writing the value; this may strain the limited capacity of the on-chip RAM. A third problem is that recovery from the power-down mode is delayed by the time needed to execute the routine that checks the value in the RAM and decides whether the RAM contents are intact. A fourth problem is that this routine must be stored in program memory, where it occupies an undesirably large amount of space.

SUMMARY OF THE INVENTION

An object of the present invention is to solve the preceding problems by providing a system for recovering from the power-down mode in a single-chip microcomputer that initializes the RAM contents when the power supply to the microcomputer has been interrupted during the power-down mode, but does not take up unnecessary execution time or memory space.

In this system, the microcomputer recovers from the power-down mode by means of an interrupt that bypasses RAM initialization. In addition, the power supply is linked to the microcomputer's reset input pin, so if the power supply voltage temporarily drops during the power-down mode, restoration of the power supply voltage later causes the microcomputer to reset and initialize its RAM contents.

BRIEF DESCRIPTION OF THE DRAWINGS

FIG. 3 is a block diagram showing another embodiment of the control system according to the invention.

DESCRIPTION OF THE PREFERRED EMBODIMENTS

Figure 1:
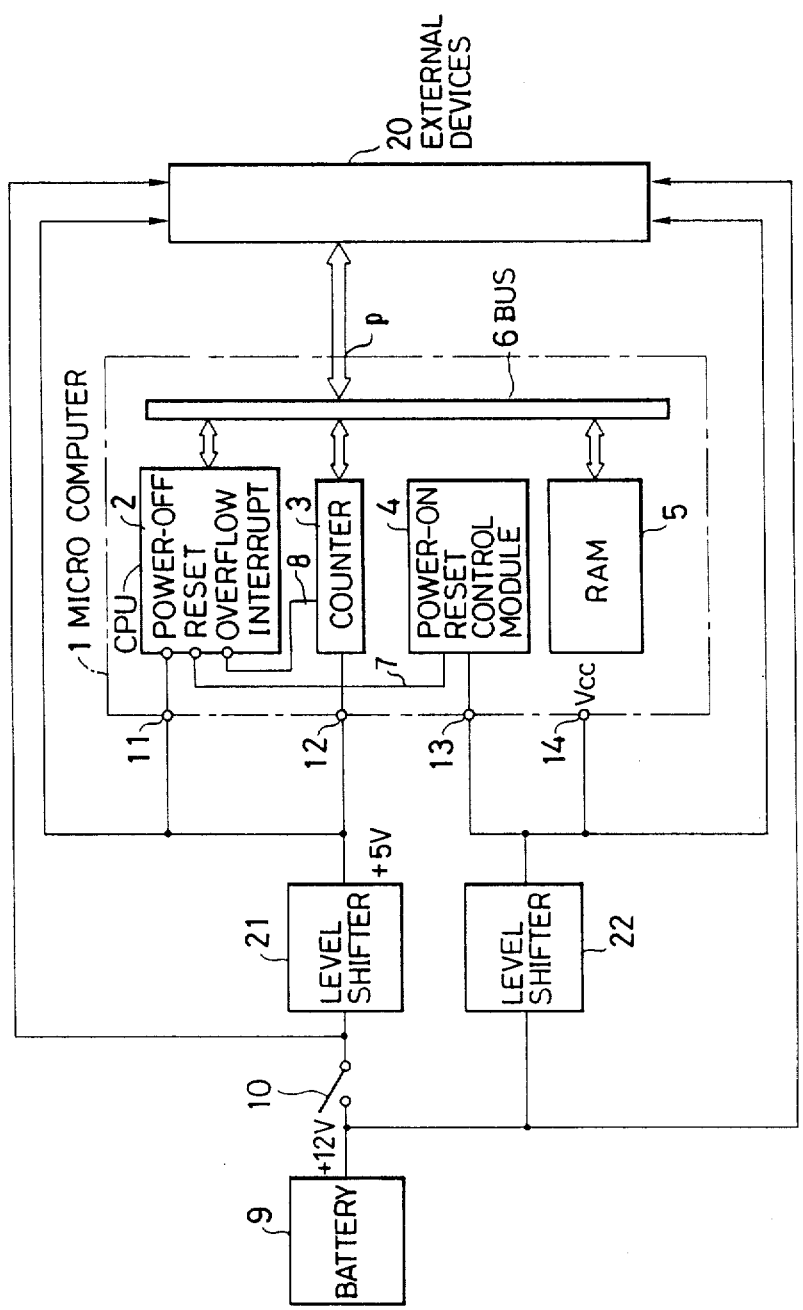
FIG. 1 is a block diagram showing an embodiment of a control system including a single-chip microcomputer and external devices controlled by the microcomputer, according to the invention.

FIG. 1 is a block diagram showing a control system including a single-chip microcomputer 1 and external devices, collectively indicated by reference numeral 20, which should be monitored and controlled by the microcomputer 1. The external devices 20 include sensors, switches, actuators, their drivers and associated circuits.

An example of a single-chip microcomputer that can be used is the MSM83C154RS manufactured by Oki Electric Industry Co., Ltd. The microcomputer chip 1 in FIG. 1 comprises a CPU 2, an event counter 3, a power-on reset control module 4, and a RAM 5. Although other components, such as a ROM, are also present, they are omitted from illustration. The event counter 3 can be one of the three timers/counters that are built in the MSM83C154RS. The above components communicate with each other by means of a bus 6 and by various signal lines, including a Reset signal line 7 by which the power-on reset control module 4 sends the CPU 2 a Reset signal that causes the CPU 2 to restart program execution from the initial address (address 0000 in the MSM83C154RS), and an Overflow Interrupt signal line 8 on which the event counter 3 can send the CPU 2 an Overflow Interrupt signal that causes the CPU 2 to restart program execution from a certain address (address 000B in the MSM83C154RS).

The microcomputer 1 is connected through various ports collectively indicated by reference numeral P, to the external devices 20.

The entire system including the microcomputer 1 and the external devices 20 is powered from a battery 9, through an ignition key switch 10. That is, it receives a +12 V voltage at the output of the ignition key switch 10 and a +5 V voltage at the output of a level shifter 21 which converts the +12 V input to a +5 V output. This power is called the ignition power, or IGP, which is supplied to the external devices 20 for their normal operation that should be performed when the ignition key switch 10 is closed and the automobile is in operation. In this sense, it is the operating power supply or the main power supply for the external devices 20 or the entire control system.

The microcompter 1 and the external devices 20 are also powered from the battery 9, directly, i.e., bypassing the ignition key switch 10. They receive a +12 V voltage at the output of the battery 9, and a +5 V voltage at the output of another level shifter 22, which converts the +12 V input to a +5 V output. The power supply port ($V_{CC}$) 14 of the microcomputer 1 is connected to the output of the level shifter 22. This power is called a back-up power supply, or VBU, because it is a back-up for the entire control system.

In addition to furnishing the power to the microcomputer chip 1 through the power supply port ($V_{CC}$) 14, VBC is connected as an input signal to a Reset input port 13 connected to the power-on reset control module 5, which generates a Reset signal on the rising edge of VBU. IGP is connected to a power-off detection input port 11 which can be read by the CPU 2, and to a counter input port 12 connected to the event counter 3; the event counter increments on the rising edge of the input signal at the counter input port 12.

Figure 2:
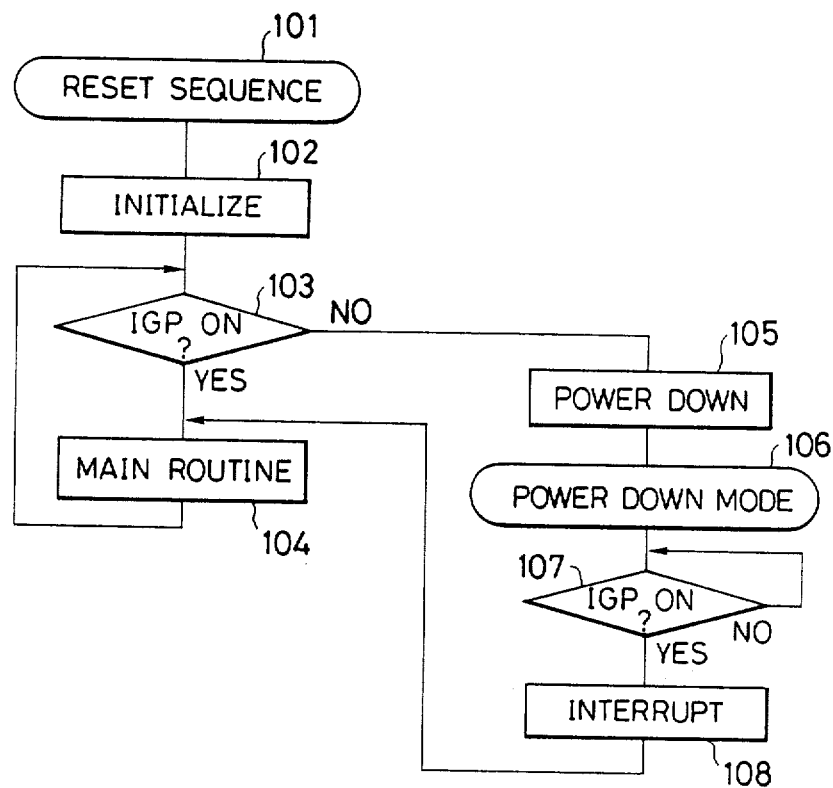
FIG. 2 is a flowchart showing the operation of the system.

FIG. 2 is a flowchart showing how the microcomputer system in FIG. 1 enters and exits the power-down mode. The reset sequence 101 in FIG. 2 is a sequence of operations performed by the CPU when it receives a Reset signal from the power-on reset control module 4 in FIG. 1. The final operation in the reset sequence 101 is to start program execution from the initial address (address 0000). The program executed by this microcomputer system includes an initialize routine 102 for initializing the RAM 3, an IGP check routine 103 for reading the power-off detection input port 11 and checking whether IGP is on or off, a power-down routine 105 which places the microcomputer chip 1 in the power-down mode 106, and a main routine 104 which carries out the main functions of the microcomputer system, which, for example, include monitoring and controlling the external devices 20 for control of an automobile engine system. This includes detection of the status of various switches or sensors in the external devices 20, and determination of the desired status for on/off control or calculation of manipulated variables, and output of control signals or maniputed variables to the actuators or drivers. Note that the initialize routine 102 is never executed except after a power-on reset 101.

When VBU is first applied, the microcomputer chip 1 executes its reset sequence 101 and initialize routine 102. When the ignition key switch 10 is closed and IGP is on, the microcomputer 1 enters a loop in which it executes its main routine 104 repeatedly, preceded each time by the IGP check routine 103 that checks whether IGP is still on. The microcomputer chip 1 stays in this loop as long as IGP and VBU both remain on, i.e., the battery 9 is connected and not dead, and the ignition key switch 10 is closed.

If ignition key switch 10 is turned off at some point, operation of the engine control system is stopped. In other words, the control system is in the power-off state, and the microcomputer chip 1 enters the power-down mode as follows. If the microcomputer chip 1 is currently executing its main routine 104, it continues to do so. At the termination of the main routine 104, the IGP check routine 103 reads the power-off detection input port 11, detects that IGP is off, and branches to the power-down routine 105. The power-down routine 105 includes an instruction that writes such a count value via the bus 6 to the event counter 3 that when the event counter 3 subsequently receives one more input signal, it will overflow and generate an interrupt. (For instance, with one of the timers/counters built in the MSM83C154RS the interrupt is the Overflow Interrupt and the above-mentioned count value is FFFF.) This write instruction is followed by an instruction that causes the microcomputer chip 1 to enter the power-down mode 106, in which application of control clocks to the CPU is prevented and program execution halts.

When the ignition key switch 10 is turned on (107) to restart the operation of the engine control system, or in other words, the control system recovers from the power-off state, the microcomputer chip 1 recovers from the power-down mode as follows. First, the rising edge of the IGP signal at the counter input port 12 in FIG. 1 causes the event counter 3 to increment (from FFFF to 0000 in the MSM83C154RS) and generate an Overflow Interrupt signal (108) which restarts the CPU 2. Program execution resumes from the address corresponding to the Overflow Interrupt, which address contains an instruction that jumps to the beginning of the main routine 104. Thereafter the microcomputer continues to execute its main routine 104 and IGP check routine 103 in the same loop as before, to perform control over the external devices 20.

Suppose that while IGP is off and the microcomputer chip 1 is in the power-down mode, the VBU voltage drops temporarily, then rises again. This can happen if the battery 9 is disconnected and thereafter connected again. The rising edge of VBU is detected by the power-on reset control module 4, which generates a Reset signal, causing the CPU 2 to execute the power-on reset sequence 101 and restart program execution at the initial address (0000). The initialize routine 102 initializes the RAM contents. Next the IGP check routine 103 reads the power-down detection input port 11, finds that IGP is off, and branches to the power-down routine 105, which writes the same value (FFFF) again in the event counter 3, then enters the power-down mode 106. When the ignition key switch 10 is later turned back on, the microcomputer chip 1 will recover from the power-down mode and begin executing its main routine using the initialized contents of the RAM 5.

It might happen that after entering the power-down mode, both IGP and VBU come on at the same time. This can happen when a batery 9 that has been disconnected is connected after the ignition key switch 10 has been closed. In this case the CPU 2 will receive a Reset signal from the power-on reset control module 4 and an Overflow Interrupt signal from the event counter 3 simultaneously, but since the Reset signal has the highest priority, the CPU will execute its reset sequence 101 and initialize routine 102 before proceeding to the main routine 104. Accordingly, if the power VBU fails, the RAM contents will always be initialized before the main routine is executed.

It will be apparent that this method of recovery from the power-down mode uses no space whatsoever in the RAM 5, requires no routine for checking the RAM contents, and causes little delay in entering and no delay in exiting the power-down mode. All it entails is a single instruction for writing the necessary count value in the event counter 3 before the power-down mode is entered. A particular advantage of this method is that it enables the RAM 5 to be initialized in response to a temporary back-up power failure while ignition key switch 10 is off, so that execution of the main routine 104 can begin immediately when ignition key switch 10 is closed.

Another embodiment of the system for recovering from the power-down mode according to this invention is shown in the block diagram in FIG. 3. Elements that are the same as in FIG. 1 are indicated by the same numerals. In this embodiment IGP is connected to an External Interrupt port 15 of the microcomputer chip 1, instead of being connected to a counter input port 12 of FIG. 1. This External Interrupt port 15 can be one of the two external interrupt ports that are provided in the MSM83C154RS. Accordingly, when IGP is switched on, the rising edge of IGP at the External Interrupt port 14 causes a CPU interrupt directly. The address of the External Interrupt (address 0003 in the MSM83C154RS) contains an instruction that jumps to the beginning of the main routine 104 in FIG. 2.

In this embodiment, it is not necessary for the power-down routine 105 in FIG. 2 to write a count value in an event counter, since an event counter is not used to generate the interrupt that recovers the microcomputer chip 1 from the power-down mode. Apart from this difference, the embodiment in FIG. 3 operates in the same way as the embodiment in FIG. 1. However, the step 105 is not required. As before, if IGP and VBU come on simultaneously, the RAM 5 is initialized, because a Reset has higher priority than an External Interrupt.

In the embodiment described, the detection of the off-state of the IGP is performed at a check routine preceding the main routine. But it is also possible to perform this detection as a hardware function. This scheme is particularly suitable for the embodiment of FIG. 3 in which it is not necessary to execute an instruction at the entry into the power-down mode.

An example of a microcomputer that can be used is the MSM83C154RS microcomputer manufactured by Oki Electric Industry Co., Ltd., as mentioned before, but other microcomputers can equally be used. Although this invention is of particular utility in single-chip microcomputer systems, it can also be applied in microcomputer systems comprising a plurality of chips.

What is claimed is:

1. A control system for use with a power source that is subject to failure or disconnection, said control system comprising:
    main power means, normally connected to the power source, for providing a switchable main power supply;
    back-up power means, normally connected to the power source, for continuously providing a back-up power supply as long as the power source remains operative and remains connected to the back-up power means;
    external devices which are connected to at least the main power means; and
    a microcomputer having a CPU and a volatile memory, the microcomputer being powered by the back-up power supply and being operable, when the main power supply is switched on, in a normal mode in which the CPU executes a main routine for monitoring and controlling the external devices and updating data in the volatile memory, the microcomputer additionally being operable, when the main power supply is switched off, in a power-down mode in which the CPU halts and data in the volatile memory is maintained,
    wherein the microcomputer additionally includes interrupt means, connected to the main power means, for causing an interrupt if the main power supply is switched from the off-state to the on-state, the microcomputer resuming execution of the main routine in the normal operating mode after the interrupt.

2. A system according to claim 1, wherein the microcomputer further includes means, connected to the back-up power means, for resetting the microcomputer if the back-up power supply rises, so that the CPU starts execution of an initialize routine.

3. A system according to claim 1, wherein the interrupt means comprises:
    an event counter connected to the main power means, the event counter being resposive to a count input signal in the form of a transition when the main power supply is switched from off to on;
    means for detecting the off-state of the main power supply; and
    means for setting, upon detection of the off-state of the main power supply, such a value in the event counter that, upon the next count input signal, the event counter overflows to produce an interrupt signal which initiates the interrupt.

4. A system according to claim 1, wherein the interrupt means comprises an external interrupt input port of said microcomputer which is connected to the main power means, and means in the microcomputer and connected to the external interrupt input port for responding to a rising edge of said main power supply by producing the interrupt.

5. A system according to claim 1, wherein the main power means comprises a level shifter and a switch which selectively connects the level shifter to the power source, and wherein the back-up power means comprises an additional level shifter connected directly to the power source.

6. A method of recovery from a power-down state in a microcomputer having a CPU and a volatile memory, said microcomputer being powered from a first power supply and additionally being connected to a second power supply having an on-state and an off-state, said microcomputer being operable, when the second power supply is in the on-state, in a normal mode in which the CPU executes an initializing routine and a main routine and being operable, when the second power supply is in the off-state, in a power-down mode in which the CPU halts and data in the volatile memory is maintained, said method comprising the steps of:
    generating an interrupt when said second power supply changes from the off-state to the on-state; and
    causing the microcomputer to resume execution of the main routine in its normal operating mode after the interrupt.

7. A method according to claim 6, further comprising:
    resetting the microcomputer if the first power supply rises, wherein the CPU starts execution of the initialize routine.

8. A method according to claim 6, wherein the microcomputer includes an event counter which is connected to the second power supply and which is responsive to a count input signal in the form of a transition from the off-state to the on-state of the second power supply; and wherein the step of generating an interrupt comprises:

detecting the off-state of the second power supply; and setting, upon detection of the off-state of the second power supply, such a value in the event counter that, upon the next count input signal to said event counter, said event counter produces an interrupt signal by overflowing; and using said interrupt signal from said event counter to cause said interrupt.

9. A method according to claim 6, wherein said step of generating an interrupt comprises:

conveying the potential at an output port of said second power supply to an external interrupt input port of said microcomputer, said microcomputer having means connected to said external interrupt input port for responding to a rising edge of said second power supply by producing an interrupt signal; and using said interrupt signal for causing said interrupt.

10. A method according to claim 6, wherein said second power supply cannot be on when said first power supply is off.

11. A control system comprising:

a microcomputer having a CPU and a volatile memory;

external devices monitored and controlled by said microcomputer;

said external devices being powered from a main power supply and a back-up power supply;

said microcomputer being powered from said back-up power supply and being selectively operable in a normal mode in which the CPU executes an initialize routine and a main routine for monitoring and controlling said external devices and updating data in the volatile memory, or in a power-down mode in which the CPU halts and the microcomputer maintains data in the volatile memory;

said microcomputer being connected to detect said main power supply and being operable in said normal mode when it finds said main power to be on, and being operable in said power-down mode when it finds said main power to be off;

said CPU being responsive to a transition of said main power supply from the on-state to the off-state for stopping execution of said main routine; and said microcomputer being responsive to a transition of said main power supply from the off-state to the on-state for performing an interrupt to resume execution of the main routine in said normal mode.

12. A system according to claim 11, wherein said microcomputer further comprises:

a main power rise detection terminal connected to said main power supply;

an event counter connected to said main power supply detection terminal for receiving the voltage of said main power supply as its count input, the event counter incrementing its count value responsive to a rising edge of its count input; and a main power off-state detection terminal connected to said main power supply;

said CPU being connected to said main power off-state connection terminal for receiving the voltage of said main power supply and detecting a transition to the off-state of said main power supply, and, upon detection of said transition to the off-state, said CPU stops execution of the main routine, and sets in said event counter such a predefined count value that upon a subsequent count input said event counter produces an interrupt signal;

whereby when said main power supply rises with said event counter having said predefined count value set in it, said event counter increments its count value, and said event counter produces said interrupt signal; and said CPU is connected to be responsive to said interrupt signal for performing said interrupt.

13. A system according to claim 12, wherein said predefined count value is a first value which is one short of a second predefined value with which said event counter produces said interrupt signal, whereby when said main power supply rises with said first predefined value set in it, said event counter increments its count value which will thereby become said second predefined value, and said event counter produces said interrupt signal.

14. A system according to claim 11, wherein said microcomputer is connected to detect a rise of said back-up power supply, and is reset to start the initialize routine if it detects a rise in the back-up power supply.

15. A system according to claim 11, wherein said microcomputer comprises:

a main power rise detection terminal connected to said main power supply;

said CPU being connected to said main power rise detection terminal for receiving the voltage of said main power supply, and performing the interrupt responsive to the rising edge of the main power supply;

a main power off-state detection terminal connected to said main power supply;

said CPU being connected to said main power off-state connection terminal for receiving the voltage of said main power supply and detecting a transition to the off-state of said main power supply, and, upon detection of said transition to the off-state, said CPU stops execution of the main routine.

16. A system according to claim 11, wherein said main power supply comprises a switch which selectively connects said main power supply to said back-up power supply.

17. A system according to claim 11, wherein said microcomputer further comprises:

a back-up power supply detection terminal connected to said back-up power supply; and a power-on reset control circuit connected to said back-up power supply detection terminal for detecting a rise of said back-up power supply and producing a reset signal when it detects a rise in said back-up power supply;

said CPU being responsive to said reset signal for performing a reset sequence by which said microcomputer is reset.

18. A microcomputer system comprising:

a single-chip microcomputer having a CPU and a volatile memory;

said microcomputer being connected to a main power supply and a back-up power supply and being selectively operable in a normal mode in which the CPU executes an initialize routine and a main routine, or in a power-down mode in which the CPU halts and the microcomputer maintains data in the volatile memory;

said microcomputer being connected to detect said main power supply and being operable in said normal mode when it finds said main power to be on, and being operable in said power-down mode when it finds said main power to be off;

said CPU being responsive to a transition of said main power supply from the on-state to the off-state for stopping execution of said main routine; and said microcomputer being responsive to a transition of said main power supply from the off-state to the on-state for performing an interrupt to resume execution of the main routine in said normal mode.

19. A system according to claim 18, wherein said microcomputer further comprises:

a main power rise detection terminal connected to said main power supply;

an event counter connected to said main power supply detection terminal for receiving the voltage of said main power supply as its count input, the event counter incrementing its count value responsive to a rising edge of its count input; and a main power off-state detection terminal connected to said main power supply;

said CPU being connected to said main power off-state connection terminal for receiving the voltage of said main power supply and detecting a transition to the off-state of said main power supply, and, upon detection of said transition to the off-state, said CPU stops execution of the main routine, and sets in said event counter such a predefined count value that upon a subsequent count input said event counter produces an interrupt signal;

whereby when said main power supply rises with said event counter having said predefined count value set in it, said event counter increments its count value, and said event counter produces said interrupt signal; and said CPU is connected to be responsive to said interrupt signal for performing said interrupt.

20. A system according to claim 19, wherein said predefined count value is a first value which is one short of a second predefined value with which said event counter produces said interrupt signal, whereby when said main power supply rises with said first predefined value set in it, said event counter increments its count value which will thereby become said second predefined value, and said event counter produces said interrupt signal.

21. A system according to claim 18, wherein said microcomputer is connected to detect a rise of said back-up power supply, and is reset to start the initialize routine if it detects a rise in the back-up power supply.

22. A system according to claim 18, wherein said microcomputer comprises:

a main power rise detection terminal connected to said main power supply;

said CPU being connected to said main power rise detection terminal for receiving the voltage of said main power supply, and performing the interrupt responsive to the rising edge of the main power supply;

a main power off-state detection terminal connected to said main power supply;

said CPU being connected to said main power off-state connection terminal for receiving the voltage of said main power supply and detecting a transition to the off-state of said main power supply, and, upon detection of said transition to the off-state, said CPU stops execution of the main routine.

23. A system according to claim 18, wherein said main power supply comprises a switch which selectively connects said main power supply to said back-up power supply.

24. A system according to claim 18, wherein said microcomputer further comprises:

a back-up power supply detection terminal connected to said back-up power supply; and a power-on reset control circuit connected to said back-up power supply detection terminal for detecting a rise of said back-up power supply and producing a reset signal when it detects a rise in said back-up power supply;

said CPU being responsive to said reset signal for performing a reset sequence by which said microcomputer is reset.

25. A method of monitoring and controlling devices by means of a microcomputer having a CPU and a volatile memory, said devices being powered from a main power supply and a back-up power supply, and said microcomputer being selectively operable in a normal mode in which the CPU executes an initialize routine and a main routine for monitoring and controlling said external devices and updating data in the volatile memory, or in a power-down mode in which the CPU halts and the microcomputer maintains data in the volatile memory, said method comprising the steps of:

applying said back-up power supply to said microcomputer;

detecting by means of said microcomputer whether said main power supply is on or off;

causing said microcomputer to operate in said normal mode when said main power is found to be on;

causing said microcomputer to operate in said power-down mode when said main power is found to be off;

stopping execution of said main routine by means of said CPU when said main power supply is found to have changed to the off-state; and performing an interrupt, by means of said microcomputer, to resume execution of the main routine in said normal mode when said main power supply is found to have changed from the off-state to the on-state.

26. A method according to claim 25, further comprising the steps of:

detecting by means of said microcomputer whether said back-up power supply is in the on-state or in the off-state;

resetting the microcomputer when the back-up power supply is found have changed to the on-state; and executing, by means of said CPU, the initialize routine, when the microcomputer is reset.

27. A method according to claim 25, wherein said microcomputer further comprises a program memory for storing programs for said main routine, and wherein said step of performing an interrupt comprises:

producing an interrupt signal upon detection of the rise of said main power supply; and jumping to an address in the program memory of said microcomputer designated by the interrupt signal.

28. A method of operating a microcomputer having a CPU and a volatile memory, said microcomputer being powered from a main power supply and additionally being connected to a back-up power supply, and said microcomputer being selectively operable in a normal mode in which the CPU executes an initialize routine and a main routine, or in a power-down mode in which the CPU halts and the microcomputer maintains data in the volatile memory, said method comprising the steps of:

applying said back-up power supply to said microcomputer;

detecting by means of said microcomputer whether said main power supply is on or off;

causing said microcomputer to operate in said normal mode when said main power is found to be on;

causing said microcomputer to operate in said power-down mode when said main power is found to be off;

stopping execution of said main routine by means of said CPU when said main power supply is found to have changed to the off-state; and performing an interrupt, by means of said microcomputer, to resume execution of the main routine in said normal mode when said main power supply is found to have changed from the off-state to the on-state.

29. A method according to claim 28, further comprising the steps of:

detecting by means of said microcomputer whether said back-up power supply is in the on-state or in the off-state;

resetting the microcomputer when the back-up power supply is found to have changed to the on-state; and executing, by means of said CPU, the initialize routine, when the microcomputer is reset.

30. A method according to claim 28, wherein said microcomputer further comprises a program memory for storing programs for said main routine, and wherein said step of performing an interrupt comprises:

producing an interrupt signal upon detection of the rise of said main power supply; and jumping to an address in the program memory of said microcomputer designated by the interrupt signal.

* * * * *